Sept. 18, 1962      A. B. HUSTON      3,054,270
GAS STERILIZING SYSTEM
Filed Aug. 19, 1960
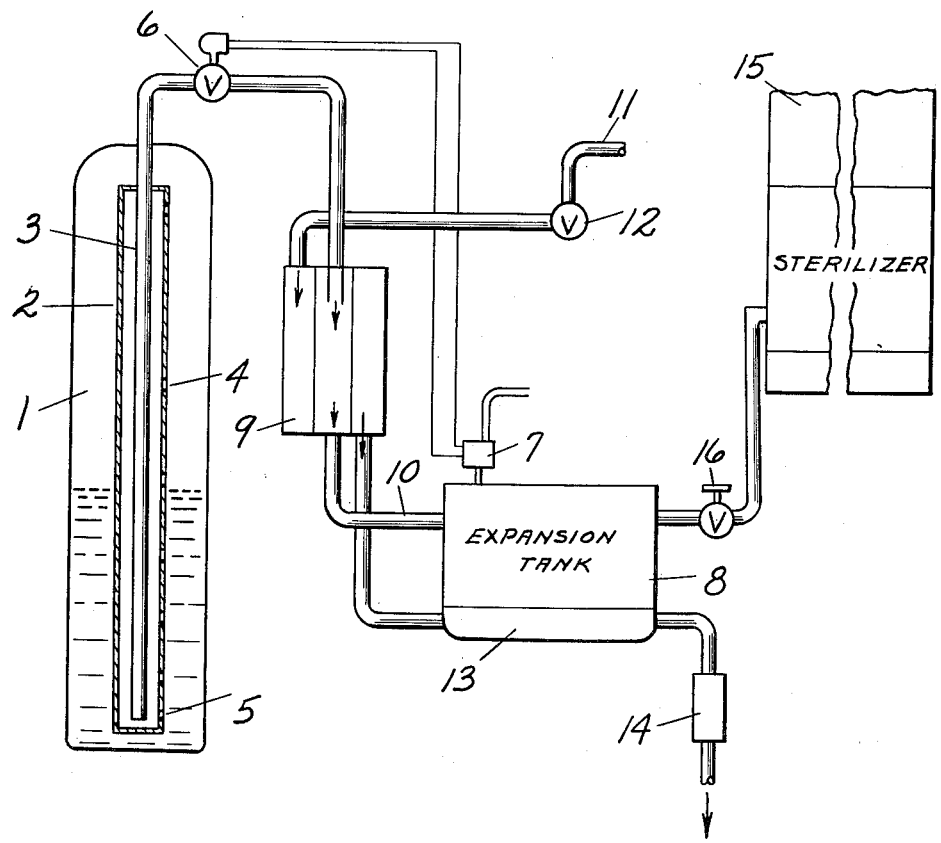
INVENTOR.
BY Alfred B Huston
Ralph Hammar
Attorney United States Patent Office 3,054,270
Patented Sept. 18, 1962

3,054,270
GAS STERILIZING SYSTEM
Alfred B. Huston, Erie, Pa., assignor to American Sterilizer Company, Erie, Pa., a corporation of Pennsylvania
Filed Aug. 19, 1960, Ser. No. 50,741
2 Claims. (Cl. 62—52)

This invention is a system for maintaining a source of a noncombustible mixture of ethylene oxide and carbon dioxide in gas phase for supplying a sterilizing chamber.

In the drawing, the single FIGURE diagrammatically illustrates the system.

The mixture of ethylene oxide and carbon dioxide is transported and stored in cylinders 1 where the mixture is highly compressed and kept under pressure while awaiting use. Under such conditions, there is a liquid phase of the components in the lower part of the cylinder and a gas phase above the liquid. Because of the widely different vapor pressures, the gas in the cylinder contains a much lower percentage of ethylene oxide than does the liquid. The particular concentration of ethylene oxide in the gas depends upon the temperature and upon the concentration of ethylene oxide in the liquid. In order that the mixture drawn off from the cylinder may contain the proper ratio of from 10% to 12% ethylene oxide, it is withdrawn through an eductor tube construction 2, 3 which mixes the gas and liquid phase in the desired portions. The outer tube 2 has a series of variably spaced holes 4, the upper holes being in contact with the gas phase and the lower holes being in contact with the liquid phase. The inner tube 3 has two holes 5 at its lower end. For the usual commercial cylinder, so long as the mixture is withdrawn from the cylinder in amounts of 1½ pounds or more, the eductor tube maintains the proper concentration of ethylene oxide until 90% of the cylinder contents have been discharged. When this point is reached, the remaining 10% is thrown away.

The discharge from the cylinder is controlled by a solenoid valve 6 and a pressure switch 7 responsive to the pressure in an expansion tank 8. The pressure switch shuts off the valve when the expansion tank pressure reaches the upper limit, e.g. 100 pounds per square inch, and opens the valve when the expansion tank pressure drops to the lower limit, e.g. 40 pounds per square inch. In order that the pressure switch may be an effective control, it is essential that the expansion tank contain only the gas phase of the mixture. This is accomplished by connecting a heat exchanger 9 in the inlet line 10 leading from the valve 6 to the expansion tank. While passing through the heat exchanger, the liquid is heated to substantially 170° F. and is completely converted to the gas phase. The expansion tank 8 is likewise heated to prevent condensation. By maintaining the mixture in the gas phase, the proper concentration of ethylene oxide is maintained in the expansion tank. If some of the mixture in the expansion tank changed to the liquid phase, the liquid would be richer in ethylene oxide and the gas phase would not contain enough ethylene oxide.

A convenient structure for heating the heat exchanger 9 and the expansion tank 8 is through a steam line 11 connected through a reducing valve 12. The steam flowing through the reducing valve enters the heat exchanger 9 and the jacket 13 of the tank, thereby maintaining the temperature in both the heat exchanger and the tank. The outlet from the expansion tank jacket is through the usual steam trap 14.

The volume of the expansion tank sheet is such that when the pressure drops to the low value, it will require at least the minimum amount of gas mixture flow from the cylinder required for proper ethylene oxide diluent ratio to build up the pressure in the expansion tank to the cut-off value of the pressure switch. This can be accomplished with a relatively small size expansion tank, approximately four cubic feet in volume, for the particular pressures and temperatures indicated. It will be appreciated that these pressures and temperatures and other conditions are subject to variation and are not critical. The temperature cannot be so high as to damage the ethylene oxide by polymerization. The temperature and pressure must be such that the mixture of ethylene oxide and carbon dioxide will remain in the gas phase in the expansion tank. The volume of the expansion tank must be related to the particular characteristics of the eductor mechanism 2, 3. If the minimum weight of the mixture which can be withdrawn from the cylinder by the eductor tube 3 should be changed by changes in the eductor tube design, corresponding changes would have to be made in the minimum size of the expansion tank.

By this construction there is maintained in the expansion tank 8 a source of ethylene dioxide gas and carbon dioxide gas in the desired proportions for supplying a sterilizing chamber 15 under the control of a suitable valve 16. The mixture can be withdrawn from the expansion tank in small quantities necessary to supply leakage without running the risk of improper ethylene oxide concentration. This results in a compact equipment which is easily controlled.

The capacity of the expansion tank 8 is substantially less than that required for holding a full cylinder in the gas phase.

Direct discharge of gas from the cylinder into the sterilizer chamber is not practical except in the case of very large chambers. The limitation on the minimum amount which can be withdrawn from the cylinder without disturbing the ratio of ethylene oxide requires excessive variation in the sterilizer chamber pressure. For example, adding 1½ pounds of gas to an eight cubic foot chamber would increase the pressure in the chamber by 13 pounds per square inch. By the present system, the gas mixture can be added to the expansion tank in 1½ pound increments but there is no limitation on the minimum amount of gas withdrawn from the expansion tank into the sterilizer chamber.

What is claimed as new is:

1. An ethylene oxide-carbon dioxide sterilizer system, comprising a high pressure cylinder containing ethylene oxide and carbon dioxide in both gas and liquid phase with the ethylene oxide concentration being greater in the liquid phase, eductor means for discharging from the cylinder a mixture of the gas and liquid phase for maintaining the desired ratio of ethylene oxide and carbon dioxide when the amount withdrawn exceeds a predetermined minimum quantity, an expansion tank of volume smaller than that required to hold the entire contents of a cylinder in gas phase, an inlet line connecting the eductor means and tank, a heat exchanger in said line for converting the liquid phase to gas, a valve in said line, means responsive to the pressure in the expansion tank for opening the valve at a low limit and closing the valve at an upper limit of the expansion tank pressure, the pressure in said expansion tank increasing less than the difference between said upper limit and said lower limit upon addition of said minimum quantity, means for maintaining the temperature of the tank above that at which condensation takes place, an outlet line leading to a sterilizer chamber, and a valve in the outlet line for controlling the supply of gas to the sterilizer chamber.

2. An ethylene oxide-carbon dioxide sterilizer system, comprising a high pressure cylinder containing ethylene oxide and carbon dioxide in both gas and liquid phase with the ethylene oxide concentration being greater in the liquid phase, eductor means for discharging from the cylinder a mixture of the gas and liquid phase and for maintaining the desired ratio of ethylene oxide and carbon dioxide when the amount of each withdrawal equals or exceeds a predetermined minimum quantity, an expansion tank of volume smaller than that required to hold the entire contents of a cylinder in gas phase, an inlet line connecting the eductor means and tank, a valve in said line, means responsive to the pressure in the expansion tank for opening the valve at a low limit and closing the valve at an upper limit of the expansion tank pressure, the pressure in said expansion tank increasing less than the difference between said upper limit and said low limit upon addition of said minimum quantity, means for converting to the gas phase the liquid phase discharged from the eductor means and for maintaining the contents of the tank in gas phase, an outlet line leading to a sterilizer chamber, and a valve in the outlet line for controlling the supply of gas to the sterilizer chamber.

References Cited in the file of this patent

UNITED STATES PATENTS

| | | |
|---|---|---|
| 2,007,738 | Baer | July 9, 1935 |
| 2,021,271 | Thomas | Nov. 19, 1935 |
| 2,183,639 | Burdick et al. | Dec. 19, 1939 |
| 2,618,935 | Malir | Nov. 25, 1952 |
| 2,964,916 | Keeping | Dec. 20, 1960 |
| 2,970,452 | Beckman et al. | Feb. 7, 1961 |